United States Patent
Lim et al.

(10) Patent No.: US 9,250,401 B2
(45) Date of Patent: Feb. 2, 2016

(54) MULTI-CHANNEL OPTICAL MODULE

(75) Inventors: Kwon-Seob Lim, Gwangju (KR); Hyun Seo Kang, Gwangju (KR); Young Sun Kim, Daejeon (KR); Young Soon Heo, Gwangju (KR); Hyoung Jun Park, Gwangju (KR); In Hee Shin, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 51 days.

(21) Appl. No.: 13/585,237

(22) Filed: Aug. 14, 2012

(65) Prior Publication Data

US 2013/0108262 A1    May 2, 2013

(30) Foreign Application Priority Data

Oct. 26, 2011    (KR) .................. 10-2011-0109875

(51) Int. Cl.
G02B 6/32    (2006.01)
G02B 6/42    (2006.01)
G02B 7/00    (2006.01)
G02B 27/10    (2006.01)

(52) U.S. Cl.
CPC ............ *G02B 6/4215* (2013.01); *G02B 6/4214* (2013.01); *G02B 7/006* (2013.01); *G02B 27/1073* (2013.01); *H04Q 2213/1301* (2013.01)

(58) Field of Classification Search
CPC .............. G02B 6/00; G02B 6/32; G02B 6/42; G02B 6/43; G02B 6/26; G02B 27/14
USPC ...................................... 385/93, 14
See application file for complete search history.

(56) References Cited

U.S. PATENT DOCUMENTS

| | | | | |
|---|---|---|---|---|
| 5,408,559 A | * | 4/1995 | Takahashi et al. | 385/89 |
| 6,480,647 B1 | * | 11/2002 | Kitamura | 385/24 |
| 6,493,121 B1 | * | 12/2002 | Althaus | 398/135 |
| 6,571,033 B2 | | 5/2003 | Caracci et al. | |
| 6,939,058 B2 | * | 9/2005 | Gurevich et al. | 385/93 |
| 6,985,647 B2 | * | 1/2006 | Takamori | 385/14 |
| 7,203,391 B2 | * | 4/2007 | Uekawa et al. | 385/14 |
| 7,215,885 B2 | * | 5/2007 | Yamane et al. | 398/85 |
| 7,281,865 B2 | * | 10/2007 | Baek et al. | 385/92 |
| 8,036,533 B2 | * | 10/2011 | Hosomi et al. | 398/79 |
| 8,235,605 B2 | * | 8/2012 | Kim | 385/92 |
| 8,488,238 B2 | * | 7/2013 | Stanley | 359/368 |

(Continued)

FOREIGN PATENT DOCUMENTS

JP    2007-121987    5/2007
JP    2009-15298    1/2009

(Continued)

*Primary Examiner* — Kaveh Kianni
(74) *Attorney, Agent, or Firm* — Nelson Mullins Riley & Scarborough LLP; Anthony A. Laurentano; Lewis Lee

(57) ABSTRACT

Multi-channel optical modules are provided. The multi-channel optical module may include a plurality of optical devices receiving or transmitting optical signals, a housing for optically coupling the plurality of optical devices to an optical fiber, at least one optical filter separating or multiplexing the optical signals according to wavelengths of the optical signals between the optical fiber and the plurality of optical devices, and at least one filter holder protruding into an inside of the housing. The optical filter may be mounted on the filter holder to align optical paths between the optical fiber and the optical devices.

17 Claims, 16 Drawing Sheets

(56) References Cited

U.S. PATENT DOCUMENTS

| | | | |
|---|---|---|---|
| 8,540,437 B2* | 9/2013 | Lee et al. | 385/93 |
| 8,545,112 B2* | 10/2013 | Chien | 385/92 |
| 2001/0022793 A1* | 9/2001 | Yokoyama | 372/29.02 |
| 2003/0152336 A1* | 8/2003 | Gurevich et al. | 385/88 |
| 2003/0215240 A1 | 11/2003 | Grann et al. | |
| 2004/0184811 A1* | 9/2004 | Takamori | 398/141 |
| 2005/0084217 A1* | 4/2005 | Yoshimura et al. | 385/88 |
| 2005/0117201 A1* | 6/2005 | Yamane et al. | 359/333 |
| 2005/0185899 A1* | 8/2005 | Lo et al. | 385/92 |
| 2006/0088255 A1 | 4/2006 | Wu et al. | |
| 2006/0115207 A1* | 6/2006 | Uekawa et al. | 385/14 |
| 2007/0047880 A1* | 3/2007 | Okada | 385/92 |
| 2007/0098335 A1* | 5/2007 | Baek et al. | 385/93 |
| 2007/0104426 A1* | 5/2007 | Yun et al. | 385/88 |
| 2007/0237465 A1* | 10/2007 | Okada | 385/92 |
| 2008/0226228 A1* | 9/2008 | Tamura et al. | 385/33 |
| 2008/0285914 A1* | 11/2008 | Matsuoka et al. | 385/24 |
| 2009/0003833 A1 | 1/2009 | Chung et al. | |
| 2009/0097847 A1* | 4/2009 | Hosomi et al. | 398/43 |
| 2009/0103923 A1* | 4/2009 | Hosomi et al. | 398/91 |
| 2010/0150571 A1* | 6/2010 | Nakanishi et al. | 398/141 |
| 2010/0209103 A1 | 8/2010 | Sakigawa et al. | |
| 2010/0226655 A1* | 9/2010 | Kim | 398/139 |
| 2010/0267049 A1* | 10/2010 | Rutter et al. | 435/7.1 |
| 2011/0032609 A1* | 2/2011 | Stanley | 359/388 |
| 2011/0058771 A1* | 3/2011 | Lee et al. | 385/33 |
| 2011/0243512 A1* | 10/2011 | Takai et al. | 385/92 |
| 2011/0311229 A1* | 12/2011 | Kondo et al. | 398/79 |
| 2013/0064519 A1* | 3/2013 | Chien | 385/137 |

FOREIGN PATENT DOCUMENTS

| | | |
|---|---|---|
| JP | 2011-112771 | 6/2011 |
| KR | 1020060023916 | 3/2006 |
| KR | 10-2007-0020800 | 2/2007 |

* cited by examiner

MULTI-CHANNEL OPTICAL MODULE

CROSS-REFERENCE TO RELATED APPLICATIONS

This U.S. non-provisional patent application claims priority under 35 U.S.C. §119 to Korean Patent Application No. 10-2011-0109875, filed on Oct. 26, 2011, the entirety of which is incorporated by reference herein.

BACKGROUND

The inventive concept relates to optical communication systems and, more particularly, to multi-channel optical modules capable of transmitting or receiving optical signals of a plurality of wavelengths using one optical fiber.

Recently, Active Optical Cables (AOC) for high-definition multimedia interface (HDMI) and digital visual interface (DVI), which have been increasingly demanded, may need four or more channels capable of concentrating lights of four or more wavelengths in one optical fiber for transmitting audio/video data. However, most marketed AOCs may have structures using a plurality of (e.g., four or two) optical fibers. Thus, it may be difficult to install, maintain, and/or repair the cables of the structures using the plurality of optical fibers. Additionally, a long-distance transmission of the optical signal may be difficult due to the cables of the structures using the plurality of optical fibers.

Generally, a conventional multi-channel optical module capable of concentrating lights of a plurality of wavelengths may have a structure which is optically coupled by reflecting a beam in zigzag-shape using a coarse wavelength division multiplexing (CWDM) filter. In this case, optical path difference between lights of the wavelengths may increase, such that a general condensing lens may not be used and alignment may be very difficult.

Alternatively, according to another conventional art, a multi-channel optical module may include a plurality of light transmitters or light receivers which are aligned in a single metal housing and are fixed by a welder. Here, each of the light transmitters or each of the light receivers may be based on a TO-CAN processing light of one wavelength. However, the optical signal may be reflected or transmitted by an optical filer mounted in the metal housing and then be coupled with one optical fiber. Thus, the optical coupling of the conventional multi-channel optical module may not be easily formed.

The multi-channel optical module described above may include two incline planes of 45 degrees on which filter are mounted. The two incline planes of 45 degrees may have a V-groove. Thus, plane processing may be difficult. Additionally, the filter holder may be formed to have a cylindrical shape, so that the filter holder may be rotated in the metal housing. Thus, the optical path may be tilted. Accordingly, if mismatch may occur by the rotation of the filter holder, optical coupling efficiency of the optical fiber may decrease significantly.

Additionally, in four or more channels, it is difficult to form the filter holder into one body. Thus, two or more filter holders may be used. In this case, the filter holders may be individually mounted, so that mounting positions of the filter holders may be different from each other. Thus, the filter holders may be misaligned with each other. As a result, an incident or transmitted beam may be tilted. The problems may be serious as the number of the channels increases.

SUMMARY

Embodiments of the inventive concept may provide multi-channel optical modules having a simple structure and an automatic alignment function of filters.

Embodiments of the inventive concept may also provide multi-channel optical modules capable of being easily formed, packaged, and expanded.

In one aspect, a multi-channel optical module may include: a plurality of optical devices receiving or transmitting optical signals; a housing for optically coupling the plurality of optical devices to an optical fiber; at least one optical filter separating or multiplexing the optical signals according to wavelengths of the optical signals between the optical fiber and the plurality of optical devices; and at least one filter holder protruding into an inside of the housing. The optical filter may be mounted on the filter holder to align optical paths between the optical fiber and the optical devices.

In another aspect, a multi-channel optical module may include: a plurality of optical devices receiving or transmitting optical signals; a housing for optically coupling the plurality of optical devices to an optical fiber; an optical fiber holder installing the optical fiber in the housing; at least one optical filter for exchanging an optical signal of a specific wavelength between one of the plurality of optical devices and the optical fiber; at least one filter holder fixing the optical filter in order that a filter surface of the optical filter is inclined with respect to a light traveling direction by a predetermined angle, the at least one filter holder protruding into an inside of the housing; and a common filter holder base fixing the at least one filter holder, the common filter holder base and the optical fiber holder provided in united body.

BRIEF DESCRIPTION OF THE DRAWINGS

The inventive concept will become more apparent in view of the attached drawings and accompanying detailed description.

DETAILED DESCRIPTION OF THE EMBODIMENTS

Figure 1:
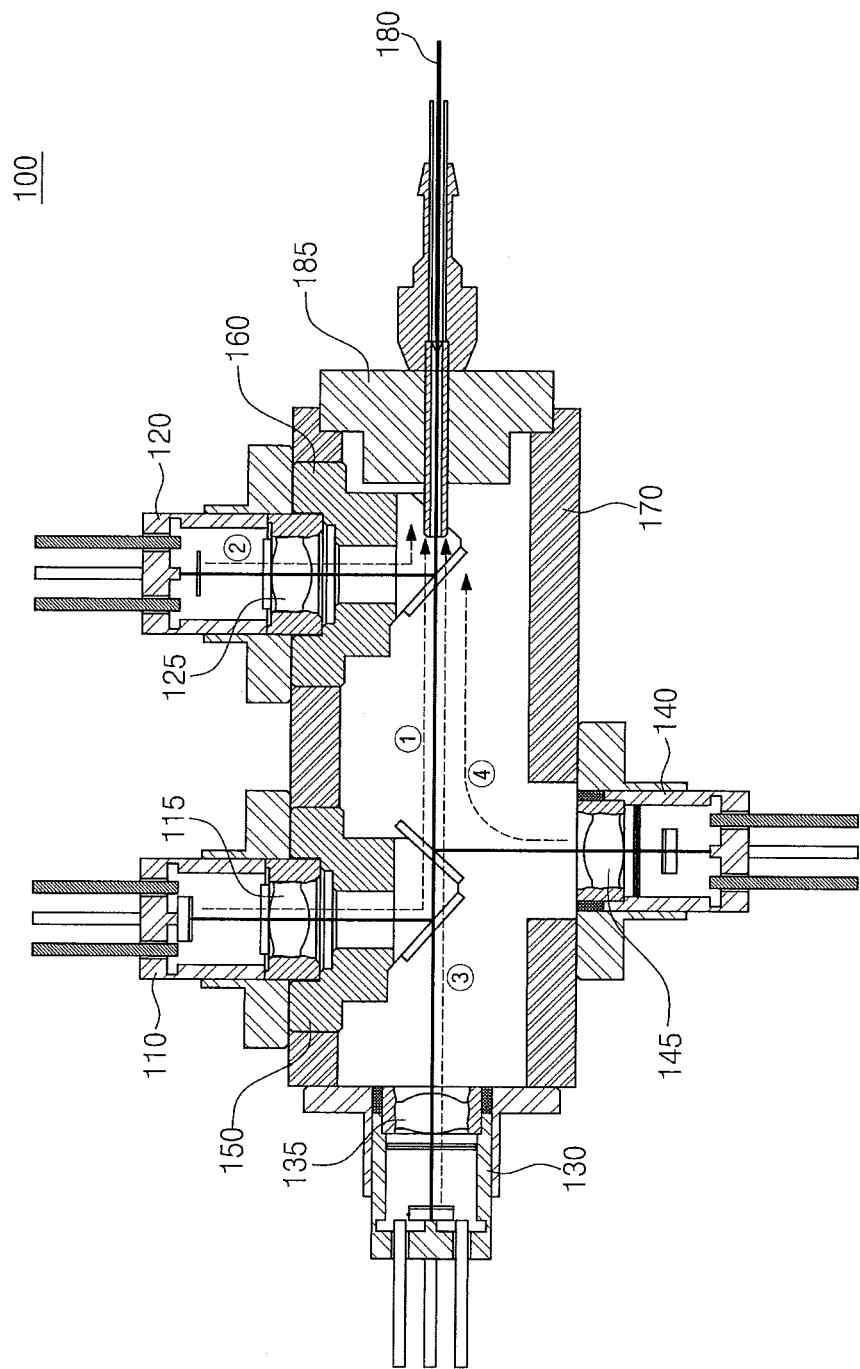
FIG. 1 is a view illustrating a multi-channel optical module according to some embodiments of the inventive concept.

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a", "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, the embodiment in the detailed description will be described with sectional views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the inventive concept.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. The same reference numerals or the same reference designators denote the same elements throughout the specification.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

FIG. 1 is a view illustrating a multi-channel optical module according to some embodiments of the inventive concept. Referring to FIG. 1, a multi-channel optical module 100 according to some embodiments of the inventive concept may include filter holders 150 and 160 for optical coupling between one optical fiber 180 and a plurality of light emitting devices 110, 120, 130, and 140. The multi-channel optical module 100 may further include a quadrangular housing 170. For the purpose of ease and convenience in explanation, a four-channel optical transmitting module will be described as an example of the multi-channel optical module 100 hereinafter.

The light emitting devices 110, 120, 130, and 140 may generate lights having wavelength different from each other. Optical signals outputted from the light emitting device 110 and the light emitting device 120 may be concentrated on the optical fiber 180 via through-holes disposed in the filter holders 150 and 160, respectively. In FIG. 1, a reference numeral '①' represents an optical path of the optical signal outputted from the light emitting device 110, and a reference numeral '②' represents an optical path of the optical signal outputted from the light emitting device 120. In other words, the optical signal outputted from the light emitting device 110 may be reflected by an optical filter mounted on the filter holder 150 at an angle of 45 degrees, and then, may be concentrated on the optical fiber 180. And the optical signal outputted from the light emitting device 120 may be reflected by an optical filter mounted on the filter holder 160 at an angle of 45 degrees, and then, may be concentrated on the optical fiber 180.

In FIG. 1, a reference numeral '③' represents an optical path of the optical signal outputted from the light emitting device 130, and a reference numeral '④' represents an optical path of the optical signal outputted from the light emitting device 140. In other words, the optical signal outputted from the light emitting device 130 may be transmitted through optical filters mounted on the filter holders 150 and 160 at an angle of 45 degrees, and then, may be concentrated on the optical fiber 180. And the optical signal outputted from the light emitting device 140 may be reflected by an optical filter mounted on the filter holder 150 at an angle of 45 degrees, and then, may be concentrated on the optical fiber 180.

Here, the filter holders 150 and 160 may be manufactured to be fixed on the quadrangular housing 170, such that optical alignment may be automatically made by insertion of the filter holders 150 and 160. The filter holders 150 and 160 may protrude into the inside of the quadrangular housing 170. The optical signals outputted from the light emitting devices 110, 130, and 140 may be concentrated on the optical fiber 180 by the optical filters mounted on the filter holder 150. Each of the filter holders 150 and 160 may be engaged with the quadrangular housing 170 for making the optical alignment by the insertion thereof. For example, side surfaces of the filter holders 150 and 160 which are in contact with the quadrangular housing 170 may be formed to have quadrangle-shapes. Additionally, the side surfaces of the filter holders 150 and 160 may be formed into various engaging structures. Thus, when the filter holders 150 and 160 are inserted in the quadrangular housing 170, the optical alignment may be automatically made.

The multi-channel optical module 100 may further include optical lenses 115, 125, 135, and 145 which condense the optical signals outputted from the light emitting devices 110, 120, 130, and 140, respectively, and couple the condensed optical signals on the optical filters. Each of the light emitting devices 110, 120, 130, and 140 may consist of a light receiver or a combination of the light receiver and a light emitting device. Thus, the multi-channel optical module 100 may be an optical transmitting module, an optical receiving module, or a transmitting and receiving module. Particularly, if the multi-channel optical module 100 is the optical receiving module, blocking filters transmitting only an optical signal of a specific wavelength may be used as the optical filters mounted on the filter holders 150 and 160 for decreasing or minimizing optical cross-talk.

Two filter holders 150 and 160 may be used for the four-channel. Two optical filters may be mounted on the filter holder 150 and a single optical filter may be mounted on the filter holder 160. After the optical filters are mounted on the filter holders 150 and 160, the filter holders 150 and 160 may be inserted in the quadrangular housing 170. Thus, the filter holders 150 and 160 may be manufactured to have automatic alignment function made by inserting the filter holders 150 and 160 in the quadrangular housing 170. A general three or more channel optical module may use a filter holder having a V-groove of a rounded cylinder shape. In this case, it may be difficult to align a center of a through-hole formed in the filter holder with a center of a through-hole formed in a quadrangular housing. Thus, an optical path of an optical signal may be tilted by the misalignment problem, so that optical coupling efficiency may be reduced. Additionally, if a general four or more channel optical module uses two or more filter holders, alignment problem between the filter holders may further occur. Furthermore, it may be difficult to form or polish the V-groove of a long cylinder shape.

However, according to embodiments of the inventive concept, since the filter holders 150 and 160 are manufactured to have shapes protruding in the quadrangular housing 170, the filter holders 150 and 160 may be easily formed to reduce a failure rate and a manufacturing time of the filter holders 150 and 160 may be reduced to realize mass production of low cost.

In the above description, the multi-channel optical module 100 including the light emitting devices is described as an example for explaining advantages of the inventive concept. However, the inventive concept is not limited thereto. The multi-channel optical module 100 may be a receiving multi-channel optical module including light receiving devices or a transmitting and receiving multi-channel optical module including light receiving devices and light emitting devices. The quadrangular housing 170 is illustrated as an example in the above description. However, the inventive concept is not limited thereto. The housing 170 may have one of various shapes except a quadrangular shape. Additionally, even though not shown in the drawings, the multi-channel optical module 100 may further a monitoring light receiving device capable of monitoring an optical power by converting portions of the optical signals outputted from the light emitting devices 110, 120, 130, and 140 into electric signals.

Figure 2A:
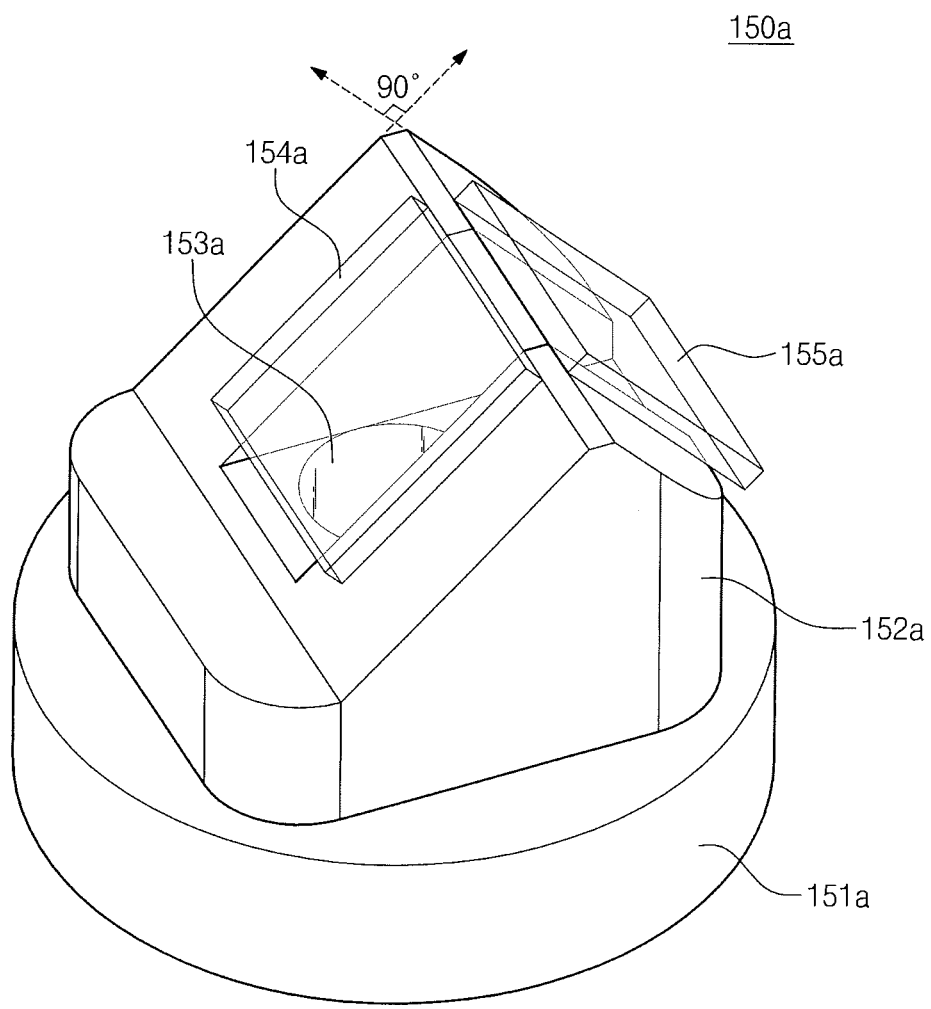
FIG. 2A is a perspective view illustrating an example of a filter holder 150 of FIG. 1.
Figure 2B:
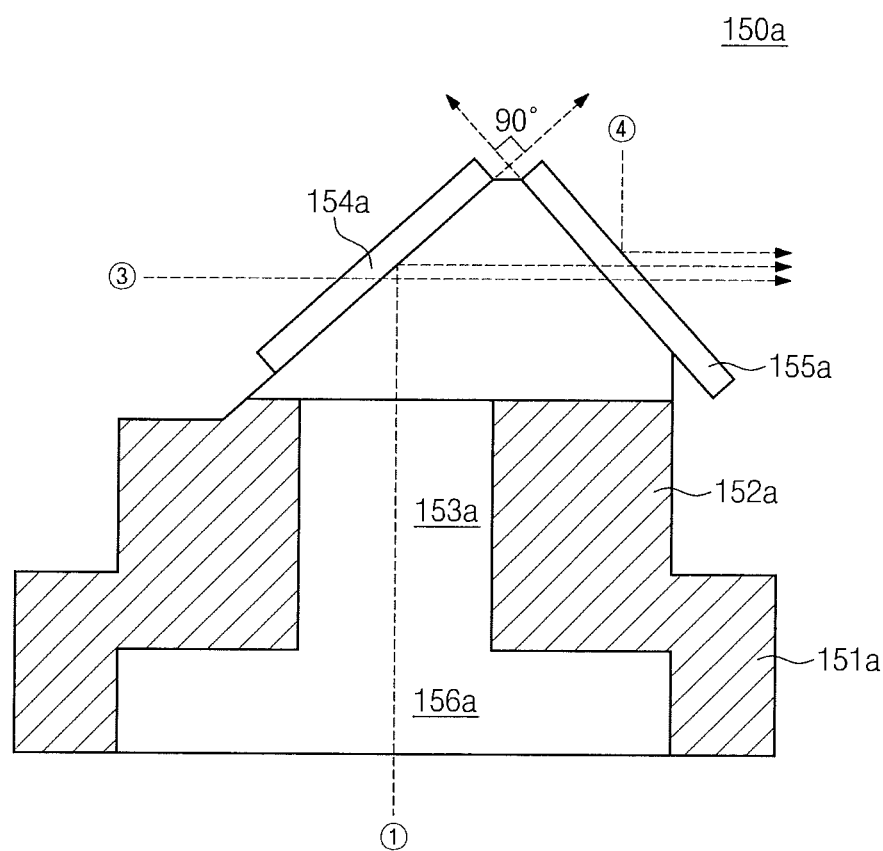
FIG. 2B is a cross-sectional view illustrating an example of a filter holder 150 of FIG. 1.

FIG. 2A is a perspective view illustrating an example of a filter holder 150 of FIG. 1. FIG. 2B is a cross-sectional view illustrating an example of a filter holder 150 of FIG. 1. Referring to FIGS. 2A and 2B, a filter holder 150*a* may have a shape capable of automatically making optical alignment when it is inserted in the quadrangular housing 170. For having this function, the filter holder 150*a* may include a filter holder base 151*a*, a filter holder body 152*a*, a through-hole 153*a*, and optical filters 154*a* and 154*b*. The filter holder 150*a* will be described in more detail hereinafter.

The filter holder 150*a* may include the filter holder base 151*a* combined with the optical lens 115 for condensing the optical signal outputted from the light emitting device 110. The filter holder base 151*a* may be manufactured in a cylindrical shape for being easily inserted in the quadrangular housing 170. The filter holder base 151*a* may include a coupling hole 156*a* as illustrated in FIG. 2B. The optical lens 115 and the light emitting device 110 may be installed in the coupling hole 156*a*. Alternatively, the coupling hole 156*a* may be manufactured in the filter holder base 151*a* in order that only the light emitting device 110 is installed in the coupling hole 156*a*.

The filter holder body 152*a* may be disposed on the filter holder base 151*a* and be connected to the quadrangular housing 170. The filter holder body 152*a* may include 45-degree angle planes on which the optical filters 154*a* and 155*a*. The 45-degree angle planes may protrude into the inside of the quadrangular housing 170. The filter holder body 152*a* may be formed to be matched with a filter holder insertion hole of FIG. 7 formed at the quadrangular housing 170. For example, the filter holder body 152*a* may be formed in a quadrangular shape. At this time, the filter holder insertion hole may be formed to have the same shape as the filter holder body 152*a*. If the filter holder 150*a* is inserted in the quadrangular housing 170 under the condition described above, the optical alignment may be made without an additional work or process. Particularly, the through-hole 153*a* may be formed in the filter holder body 152*a*. The optical signal generated from the light emitting device 110 may be condensed by the optical lens 115 and then be inputted to the optical filter 154*a* via the through-hole 153*a*.

The optical filters 154*a* and 155*a* may be mounted on the 45-degree angle planes of the filter holder body 152*a*. The optical filter 154*a* may have filter-property selectively reflecting the optical signal ① of a specific wavelength generated from the light emitting device 110. Additionally, the optical filter 154*a* may also have filter-property transmitting the optical signal ③ generated from the light emitting device 130. The optical filter 155*a* may have filter-property reflecting the optical signal ④ generated from the light emitting device 140 toward the optical fiber 180. Additionally, the optical filter 155*a* may also filter-property transmitting the optical signals ① and ③ generated from the light emitting devices 110 and 130 toward the optical fiber 180.

It may be important to exactly control the angle of the 45-degree angle planes in order that the optical filters 154*a* and 155*a* have the transmission and reflection properties described above. However, in a conventional art, a V-groove may be formed by a polishing process for forming a 45-degree angle plane. But, it may be difficult to exactly form the 45-degree angle plane by the polishing process. On the other hand, according to embodiments of the inventive concept, the protruding filter holder 150a may be easily manufactured and polished, and it is possible to form the 45-degree angle planes having an excellent surface roughness and an excellent gradient.

Figure 3A:
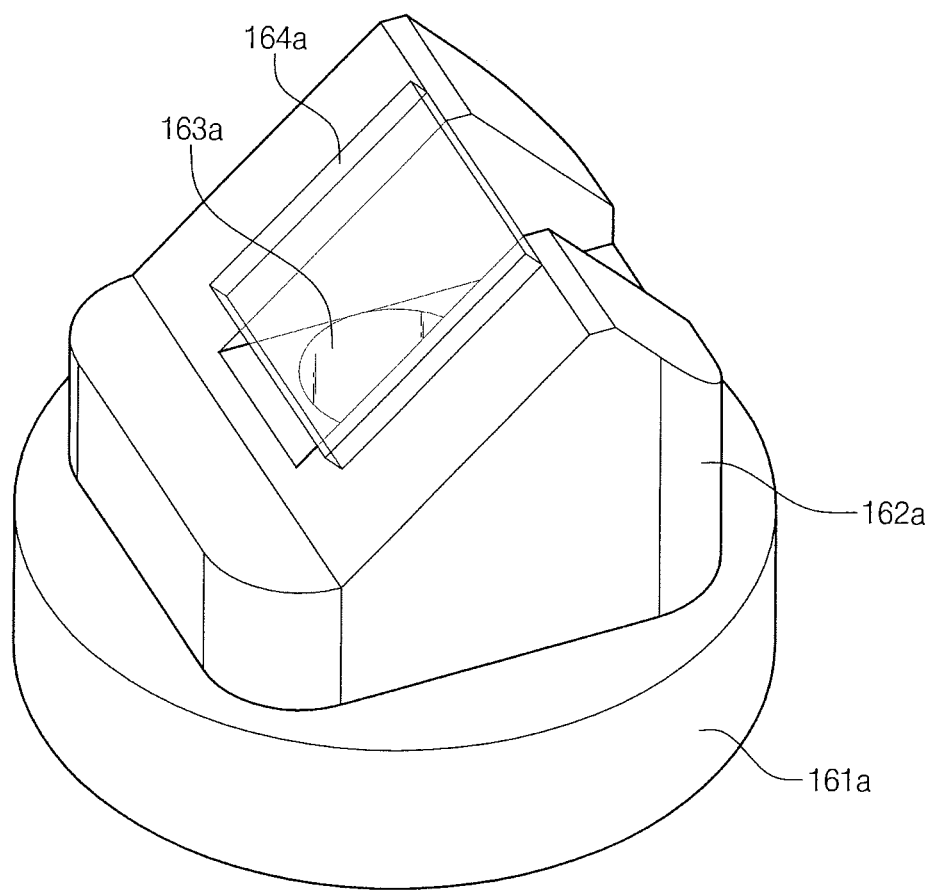
FIG. 3A is a perspective view illustrating an example of a filter holder 160 of FIG. 1.
Figure 3B:
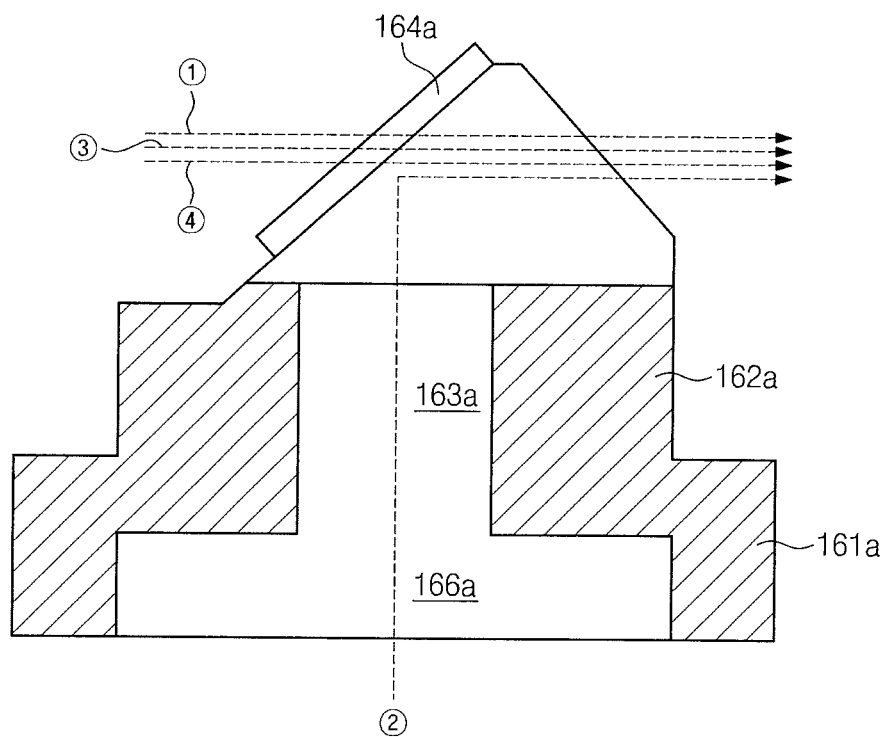
FIG. 3B is a cross-sectional view illustrating an example of a filter holder 160 of FIG. 1.

FIG. 3A is a perspective view illustrating an example of a filter holder 160 of FIG. 1. FIG. 3B is a cross-sectional view illustrating an example of a filter holder 160 of FIG. 1. Referring to FIGS. 3A and 3B, a filter holder 160a may have a shape capable of automatically making optical alignment when it is inserted in the quadrangular housing 170. For having this function, the filter holder 160a may include a filter holder base 161a, a filter holder body 162a, a through-hole 163a, and an optical filter 164a. The filter holder 160a will be described in more detail hereinafter.

The filter holder 160a may include the filter holder base 161a combined with the optical lens 125 for condensing the optical signal ② outputted from the light emitting device 120. The filter holder base 161a may be manufactured in a cylindrical shape for being easily inserted in the quadrangular housing 170. The filter holder base 161a may include a coupling hole 166a as illustrated in FIG. 3B. The optical lens 125 and the light emitting device 120 may be installed in the coupling hole 166a. Alternatively, the coupling hole 166a may be manufactured in the filter holder base 161a in order that only the light emitting device 120 is combined in the coupling hole 166a without the optical lens 125.

The filter holder body 162a may be disposed on the filter holder base 161a and be connected to the quadrangular housing 170. The filter holder body 162a may include a 45-degree angle plane on which the optical filter 164a. The 45-degree angle plane of the filter holder body 162a may protrude into the inside of the quadrangular housing 170. The filter holder body 162a may be formed to be matched with a filter holder insertion hole of FIG. 7 formed at the quadrangular housing 170. For example, the filter holder body 162a may be formed in a quadrangular shape. At this time, the filter holder insertion hole of the quadrangular housing 170 may be formed to have the same shape as the filter holder body 162a. If the filter holder 160a is inserted in the quadrangular housing 170 under the condition described above, the optical alignment may be made without an additional work or process. Particularly, the through-hole 163a may be formed in the filter holder body 162a. The optical signal generated from the light emitting device 120 may be condensed by the optical lens 125 and then be inputted to the optical filter 164a via the through-hole 163a.

The optical filter 164a may be mounted on the 45-degree angle plane of the filter holder body 162a. The optical filter 164a may have filter-property selectively reflecting the optical signal ② of a specific wavelength generated from the light emitting device 120. Additionally, the optical filter 164a may also have filter-property transmitting the optical signals ①, ③, and ④ generated from the light emitting devices 110, 130, and 140. The optical signals ①, ③, and ④ passing through the optical filter 164a and the optical signal ② reflected by the optical filter 164a may be transferred to the optical fiber 180. Even though the light emitting devices 110, 120, 130, and 140 are replaced with light receiving devices, transmitting directions of the optical signals may be changed but the optical paths of the optical signals may not be changed.

It may be important to exactly control the angle of the 45-degree angle plane of the filter holder body 162a in order that the optical filter 164a has the transmission and reflection properties described above. However, in a conventional art, a V-groove may be formed by a polishing process for forming a 45-degree angle plane. But, it may be difficult to exactly form the 45-degree angle plane by the polishing process. On the other hand, according to embodiments of the inventive concept, the protruding filter holder 160a may be easily manufactured and polished, and it is possible to form the 45-degree angle planes having an excellent surface roughness and an excellent gradient.

In the following embodiments, the filter holder 160 may have the same structure as the filter holder 150. Nothing but the number of the optical filter of the filter holder 160 may be different from that of the filter holder 150. Thus, description of a structure and a function of the filter holder 160 will be omitted hereinafter. Additionally, each of the inclined angles of the optical filters mounted on the filter holder body 152a and 162a are 45 degrees in the above embodiments. However, the inventive concept is not limited thereto. The inclined angle of a filter-surface of the optical filter may be variously set according to intention of users.

Figure 4A:
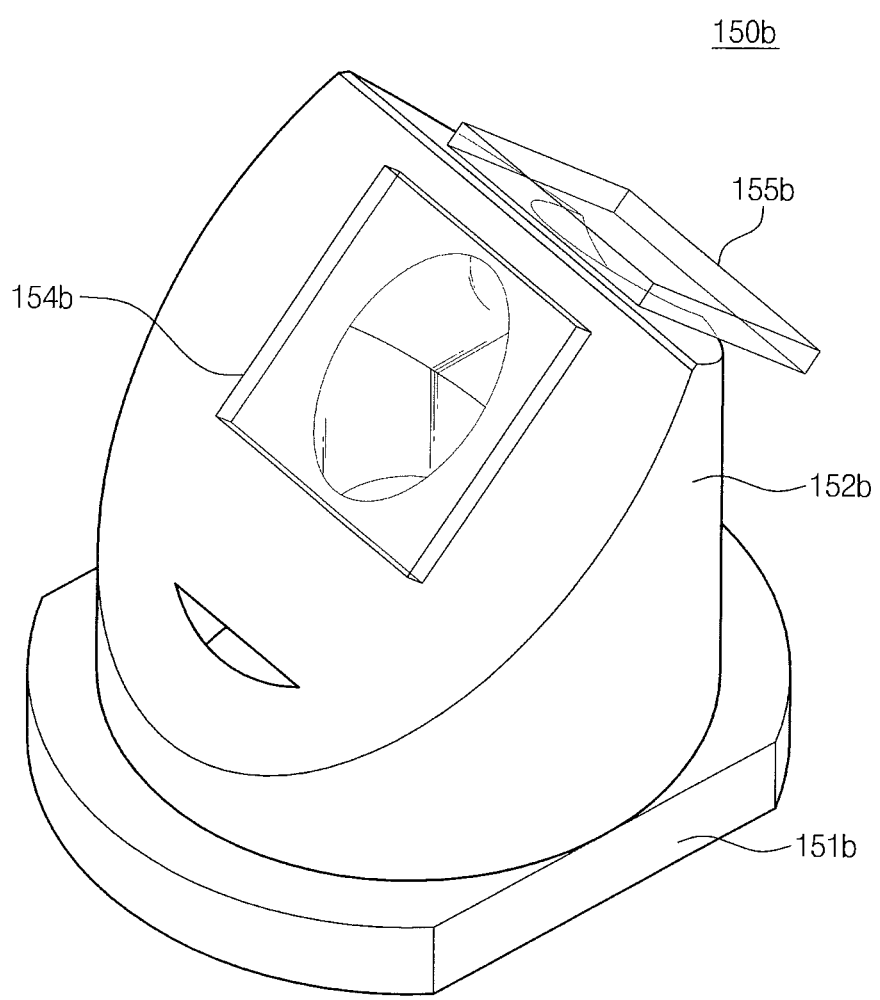
FIG. 4A is a perspective view illustrating another example of a filter holder 150 of FIG. 1.
Figure 4B:
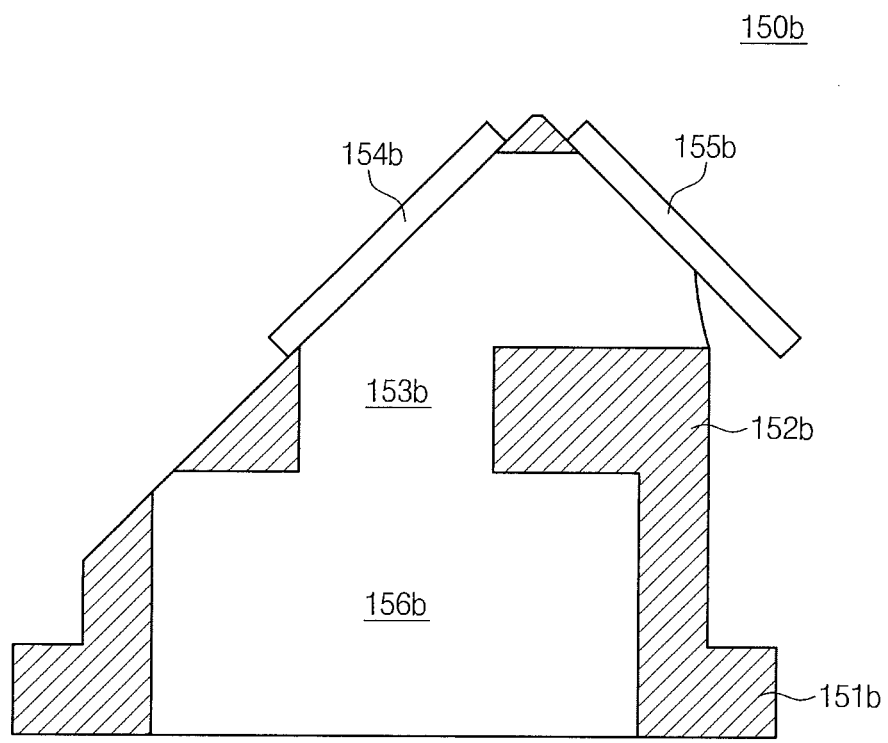
FIG. 4B is a cross-sectional view illustrating another example of a filter holder 150 of FIG. 1.

FIG. 4A is a perspective view illustrating another example of a filter holder 150 of FIG. 1. FIG. 4B is a cross-sectional view illustrating another example of a filter holder 150 of FIG. 1. Referring to FIGS. 4A and 4B, a filter holder 150b may have a shape capable of automatically making optical alignment when it is inserted in the quadrangular housing 170. For having this function, the filter holder 150b may include a filter holder base 151b, a filter holder body 152b, a through-hole 153b, and optical filters 154b and 154b. The filter holder 150a will be described in more detail hereinafter.

Differently from the filter holder 150a illustrated in FIGS. 2A and 2B, the filter holder 150b may include the filter holder base 151b of another shape. The filter holder 150b may include the filter holder base 151b combined with the optical lens 115 for condensing the optical signal outputted from the light emitting device 110. Particularly, the shape of the filter holder base 151b may be formed to make the optical alignment when it is inserted in the quadrangular housing 170. The filter holder base 151b may have a cylindrical shape of which side portions are cut away. Thus, the filter holder base 151b may have both sidewalls parallel to each other. The filter holder insertion hole may have the same shape as the filter holder base 151b. If the filter holder 150b is inserted in the quadrangular housing 170 under the condition described above, the optical alignment may be made without an additional work or process.

Figure 8:
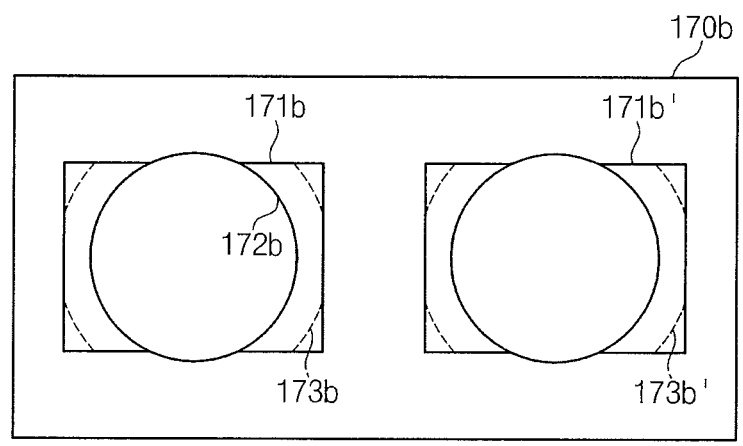
FIG. 8 is a side view illustrating another example of a quadrangular housing.

The filter holder base 151b may be formed to be matched with a filter holder insertion hole of FIG. 8 formed at the quadrangular housing 170. For example, the parallel both sidewalls of the filter holder base 151b may be formed to be matched with a quadrangular insertion hole of the quadrangular housing 170. If the filter holder 150b is inserted in the quadrangular housing 170 under the condition described above, the optical alignment may be made without an additional work or process.

Particularly, the filter holder base 151b may include a coupling hole 156b as illustrated in FIG. 4B. The optical lens 115 and the light emitting device 110 may be installed in the coupling hole 156b. Alternatively, the coupling hole 156b may be manufactured in the filter holder base 151b in order that only the light emitting device 110 is installed in the coupling hole 156b. A diameter of the coupling hole 156b may be largely formed, so that the optical lens 115 or the light emitting device 110 having a large radius may be easily installed in the coupling hole 156b.

The filter holder body 152b may be disposed on the filter holder base 151a and have a cylindrical shape. 45-degree angle planes of the filter holder body 152 which the optical filters 154b and 155b are mounted on may be formed to protrude into the inside of the quadrangular housing 170. The through-hole 153b may be formed in the filter holder body 152b. The through-hole 153b connected to the coupling hole 156b may bend by an angle of 90 degrees and provide a space for constituting an optical path between the optical filters 154b and 155b.

The optical filters 154b and 155b may be mounted on the 45-degree angle planes of the filter holder body 152b. The optical filter 154b may have filter-property selectively reflecting the optical signal of a specific wavelength generated from the light emitting device 110. Additionally, the optical filter 154b may also have filter-property transmitting the optical signal generated from the light emitting device 130. The optical filter 155b may have filter-property reflecting the optical signal generated from the light emitting device 140 toward the optical fiber 180. Additionally, the optical filter 155b may also filter-property transmitting the optical signals generated from the light emitting devices 110 and 130 toward the optical fiber 180.

It may be important to exactly control the angle of the 45-degree angle planes in order that the optical filters 154b and 155b have the transmission and reflection properties described above. However, in a conventional art, a V-groove may be formed by a polishing process for forming a 45-degree angle plane. But, it may be difficult to exactly form the 45-degree angle plane by the polishing process. On the other hand, according to embodiments of the inventive concept, the protruding filter holder 150b may be easily manufactured and polished, and it is possible to form the 45-degree angle planes having an excellent surface roughness and an excellent gradient.

Figure 5A:
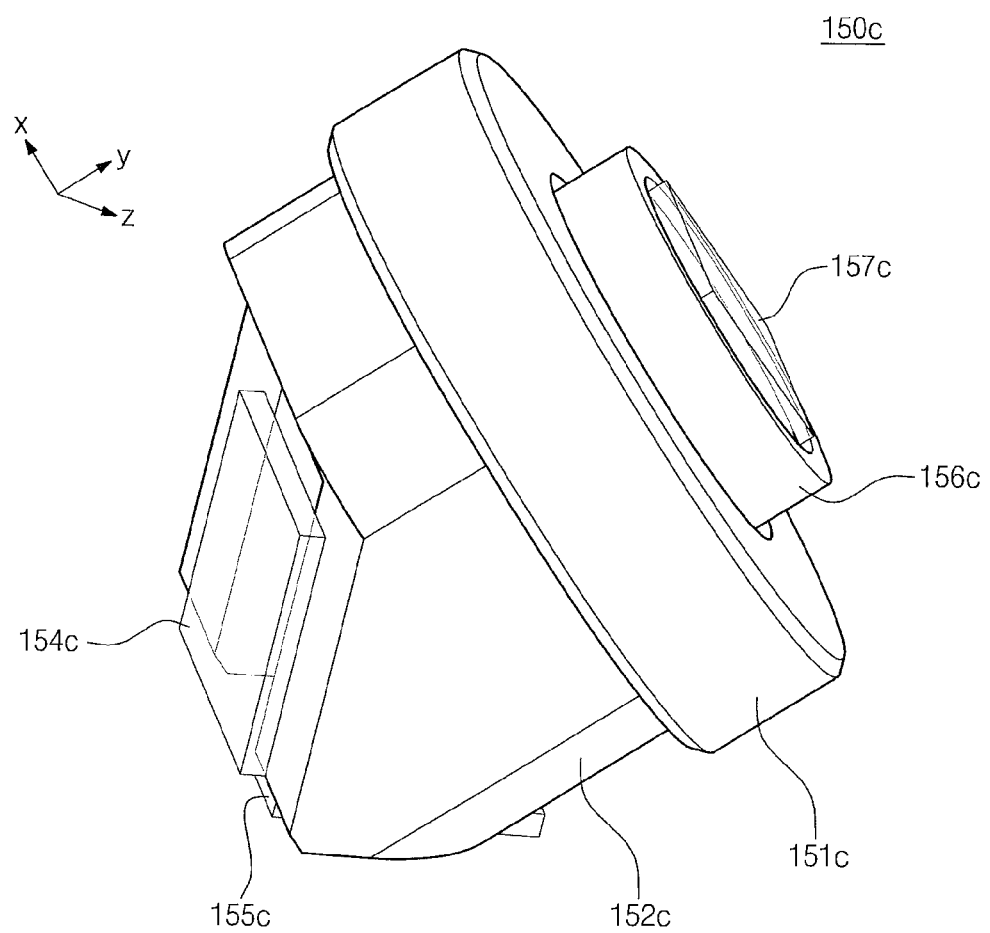
FIG. 5A is a perspective view illustrating still another example of a filter holder 150 of FIG. 1.
Figure 5B:
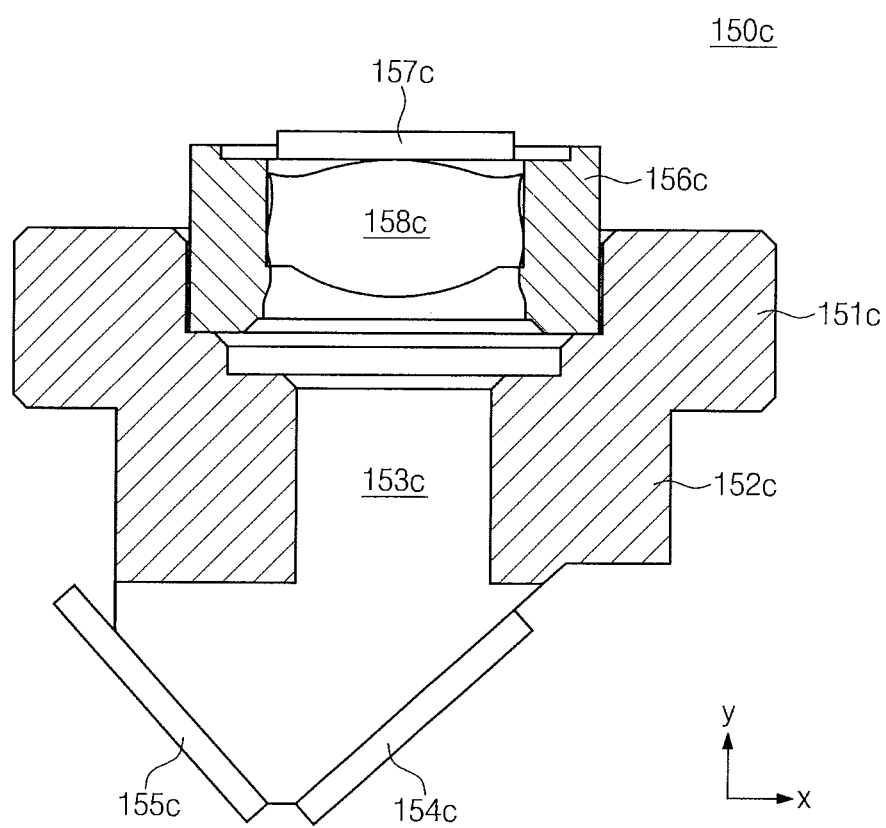
FIG. 5B is a cross-sectional view illustrating still another example of a filter holder 150 of FIG. 1.

FIG. 5A is a perspective view illustrating still another example of a filter holder 150 of FIG. 1. FIG. 5B is a cross-sectional view illustrating still another example of a filter holder 150 of FIG. 1. Referring to FIGS. 5A and 5B, a filter holder 150c may have a shape capable of automatically making optical alignment when it is inserted in the quadrangular housing 170. Additionally, the filter holder 150c may be manufactured in order that an optical lens is installed in a coupling hole disposed in a filter holder base 151c. For having this function, the filter holder 150c may include the filter holder base 151c, a filter holder body 152c, a through-hole 153c, optical filters 154c and 155c, and the optical lens 158c. When the filter holder 150c includes a coupling unit 156c and a receiving part for installing the optical lens 158c, the filter holder 150 may further include a blocking filter 157c.

The filter holder 150c may include the optical lens 158c for condensing the optical signal outputted from the light emitting device 110, and the filter holder base 151c with which the coupling unit 156c for combining the optical lens 158c is combined. The filter holder base 151c may be manufactured in a cylindrical shape for being easily inserted in the quadrangular housing 170.

The filter holder body 152c may be connected to the quadrangular housing 170. The filter holder body 152c may include 45-degree angle planes on which the optical filters 154c and 155c. The 45-degree angle planes may protrude into the inside of the quadrangular housing 170. The filter holder body 152c may be formed to be matched with a filter holder insertion hole of FIG. 7 formed at the quadrangular housing 170. For example, the filter holder body 152c may be formed in a quadrangular shape. At this time, the filter holder insertion hole of the quadrangular housing 170 may be formed to have the same shape as the filter holder body 152c. If the filter holder 150c is inserted in the quadrangular housing 170 under the condition described above, the optical alignment may be made without an additional work or process. Particularly, the through-hole 153c may be formed in the filter holder body 152c. The optical signal generated from the light emitting device 110 may be condensed by the optical lens 158c and then be inputted to the optical filter 154c via the through-hole 153c.

The optical filters 154c and 155c may be mounted on the 45-degree angle planes of the filter holder body 152c. The optical filter 154c may have filter-property selectively reflecting the optical signal of a specific wavelength generated from the light emitting device 110. Additionally, the optical filter 154c may also have filter-property transmitting the optical signal generated from the light emitting device 130. The optical filter 155c may have filter-property reflecting the optical signal generated from the light emitting device 140 toward the optical fiber 180. Additionally, the optical filter 155c may also filter-property transmitting the optical signals generated from the light emitting devices 110 and 130 toward the optical fiber 180.

It may be important to exactly control the angle of the 45-degree angle planes in order that the optical filters 154c and 155c have the transmission and reflection properties described above. However, in a conventional art, a V-groove may be formed by a polishing process for forming a 45-degree angle plane. But, it may be difficult to exactly form the 45-degree angle plane by the polishing process. On the other hand, according to embodiments of the inventive concept, the protruding filter holder 150c may be easily manufactured and polished, and it is possible to form the 45-degree angle planes having an excellent surface roughness and an excellent gradient.

Figure 6:
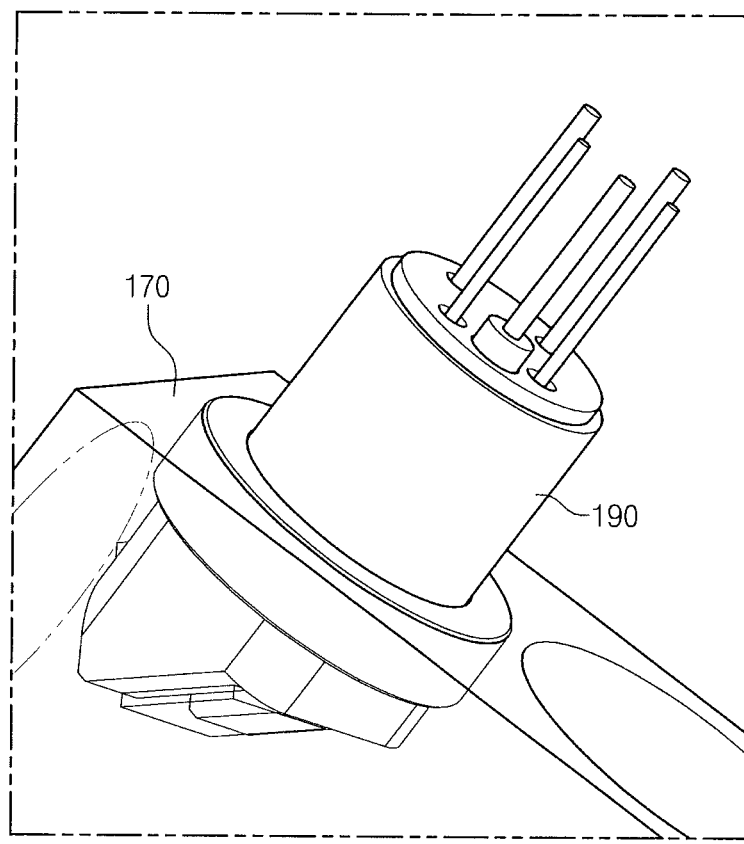
FIG. 6 is a perspective view illustrating a filter holder formed of an insulator of FIG. 1.

FIG. 6 is a perspective view illustrating a filter holder formed of an insulator of FIG. 1. Referring to FIG. 6, a package 190 including the filter holder, a light emitting device (or light receiving device), and the optical lens may be formed with an electrical insulator. The package 190 may be mounted on the quadrangular housing 170.

Particularly, when the multi-channel optical module 100 is a transmitting and receiving module, cross-talk may occur from a transmitting part to a receiving part. Thus, characteristics of the receiving part may be deteriorated. For resolving the problem and reducing the number of laser welding processes, the filter holder is formed of the insulator. And a lens may be mounted in the filter holder in which the light receiving device is mounted similarly to the embodiment of FIGS. 5A and 5B. Since the light receiving device is mounted as described above, the electrical cross-talk may be substantially reduced. Additionally, the package 190 may be manufactured by the above method, so that the number of the laser welding processes may be reduced to reduce cost of the multi-channel optical module 100. Likewise, the filter holder for constituting the transmitting part may be formed of the insulator.

Figure 7:
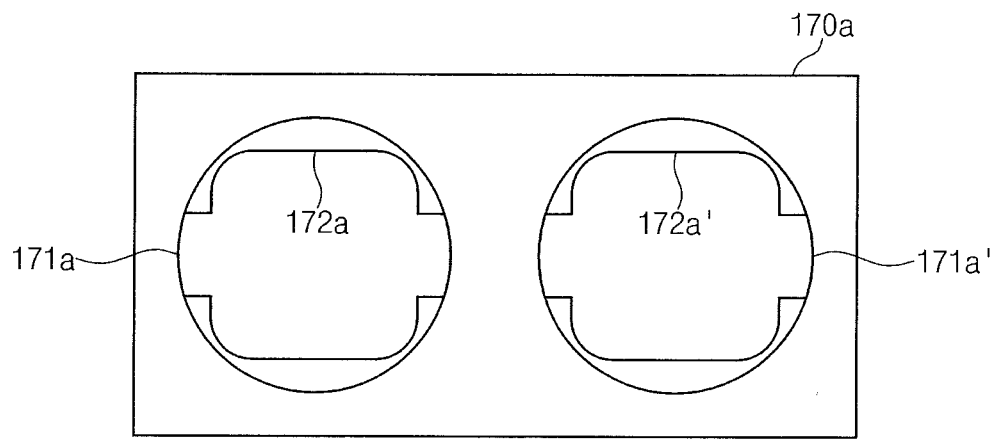
FIG. 7 is a side view illustrating an example of a quadrangular housing.

FIG. 7 is a side view illustrating an example of a quadrangular housing. Referring to FIG. 7, a quadrangular housing 170a may have a structure at which the filter holder 150a of FIGS. 2A and 2B and the filter holder 160a of FIGS. 3A and 3B are installed.

Holes 171a and 171a' of cylindrical shapes may be formed in an outer portion of a sidewall of the quadrangular housing 170a in which the filter holders 150a and 160a are inserted. And holes 172a and 172a' of quadrangular shapes may be formed in an inter portion of the sidewall of the quadrangular housing 170a in the holes 171a and 171a', respectively. Thus, when the filter holder 150a is inserted in the hole 171a, the filter holder base 151a of the cylindrical shape is inserted to only an end of the hole 172a of the quadrangular shape which is adjacent to the hole 171a. In other words, the hole 172a of the quadrangular shape may function as a threshold for the filter holder base 151a. And the filter holder body 152a of the quadrangular shape may be engaged with the hole 172a of the quadrangular shape and then be inserted into the inside of the quadrangular housing 170a. When the holder filter holder body 152a is sufficiently inserted into the inside of the quadrangular housing 170a, the protruding filter holder 150a may be automatically optical-aligned.

Here, the filter holder 160a will not be described in more detail. The filter holder 160a may have substantially the same structure as the filter holder 150a except the number of the optical filter. Thus, when the filter holder 160a is inserted in the quadrangular housing 170a, the filter holder base 161a having the cylindrical shape and the filter holder body 162a having the quadrangular shape of the filter holder 160a may be fixed at positions making the optical alignment by the hole 171a' of the cylindrical shape and the hole 172a' of the quadrangular shape, respectively. The filter holder 160a is sufficiently inserted into the quadrangular housing 170a to be automatically optical-aligned.

FIG. 8 is a side view illustrating another example of a quadrangular housing. Referring to FIG. 8, a quadrangular housing 170b may have a structure at which the filter holder 150b of FIGS. 4A and 4B and the filter holder 160b are installed. The filter holder 160b has the same filter holder base and filter holder body as those of the filter holder 150b.

Holes 171b and 171b' of quadrangular shapes may be formed in an outer portion of a sidewall of the quadrangular housing 170b in which the filter holders 150b and 160b are inserted. And holes 172b and 172b' of cylindrical shapes may be formed in an inter portion of the sidewall of the quadrangular housing 170a in the holes 171b and 171b', respectively. Thus, when the filter holder 150b is inserted in the quadrangular housing 170b, the parallel both sidewalls of the filter holder base 151b is fixed in the hole 171b of the quadrangular shape. And the filter holder body 152b of the cylindrical shape may be inserted into the quadrangular housing 170b along the hole 172b of the cylindrical shape. When the holder filter holder 150b and 160b are sufficiently inserted into the inside of the quadrangular housing 170a, the protruding filter holders 150b and 160b may be automatically optical-aligned.

Here, the filter holder 160b will not be described in more detail. The filter holder 160b may have substantially the same structure as the filter holder 150b except the number of the optical filter. Thus, when the filter holder 160b is inserted in the quadrangular housing 170b, the filter holder base 161b and the filter holder body 162b having the cylindrical shape of the filter holder 160b may be fixed at positions making the optical alignment by the hole 171b' of the quadrangular shape and the hole 172a' of the cylindrical shape, respectively. The filter holder 160b is sufficiently inserted into the quadrangular housing 170b to be automatically optical-aligned.

The filter holder base 151b of the filter holder 150b illustrated in FIGS. 4A and 4B may not be a complete quadrangular shape. In other words, only the parallel both sidewalls of the filter holder base 151b may be formed to be flat or four sidewalls of the filter holder base 151b may be formed to be flat and corners of the filter holder 151b may be formed to be rounded. If the filter holder base 151b includes only both flat sidewalls parallel to each other, spaces may exist between the quadrangular housing 170b and dot-lines 173b and 173b' in FIG. 8. However, the both flat sidewalls of the filter holder base 151b may be matched for portions of the hole 171b of the quadrangular housing 170b, such that the optical alignment may be made by insertion of the filter holder 150b. Thus, a geometric shape of the filter holder 151b is not limited to the shapes of the embodiments described above.

Figure 9:
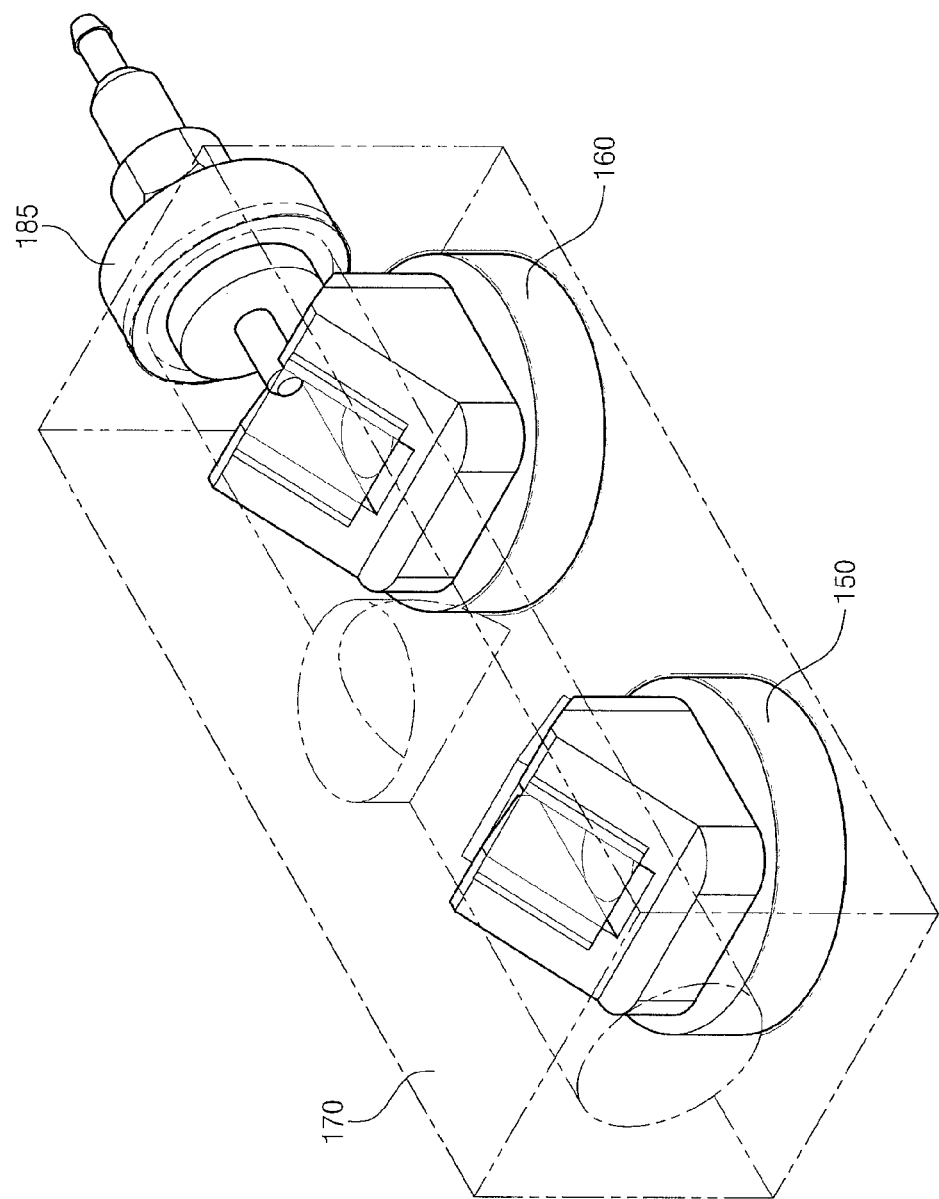
FIG. 9 is a perspective view illustrating an inside of a multi-channel optical module according to some embodiments of the inventive concept.

FIG. 9 is a perspective view illustrating an inside of a multi-channel optical module according to some embodiments of the inventive concept. FIG. 9 illustrates filter holders 150 and 160 and an optical fiber holder 185 which are inserted in the inside of the quadrangular housing 170.

In the present embodiment, the filter holders 150 and 160 and the optical fiber holder 185 may be individually installed in the quadrangular housing 170. Even though the filter holders 150 and 160 are individually inserted, the filter holder bodies or the filter holder bases of the filter holders 150 and 160 may have structures matched for holes of the quadrangular housing 170. Thus, even though the filter holders 150 and 160 and the optical fiber holder 185 are individually inserted, the holders 150, 160, and 185 may be optically aligned with the light emitting devices.

In FIG. 9, filter holder bodies of the filter holders 150 and 160 may have square pillar-shapes of which corners are rounded. However, the inventive concept is not limited thereto. The filter holder bases of the filter holders 150 and 160 may be formed to have geometric shapes combined with insertion holes of the quadrangular housing 170.

Figure 10:
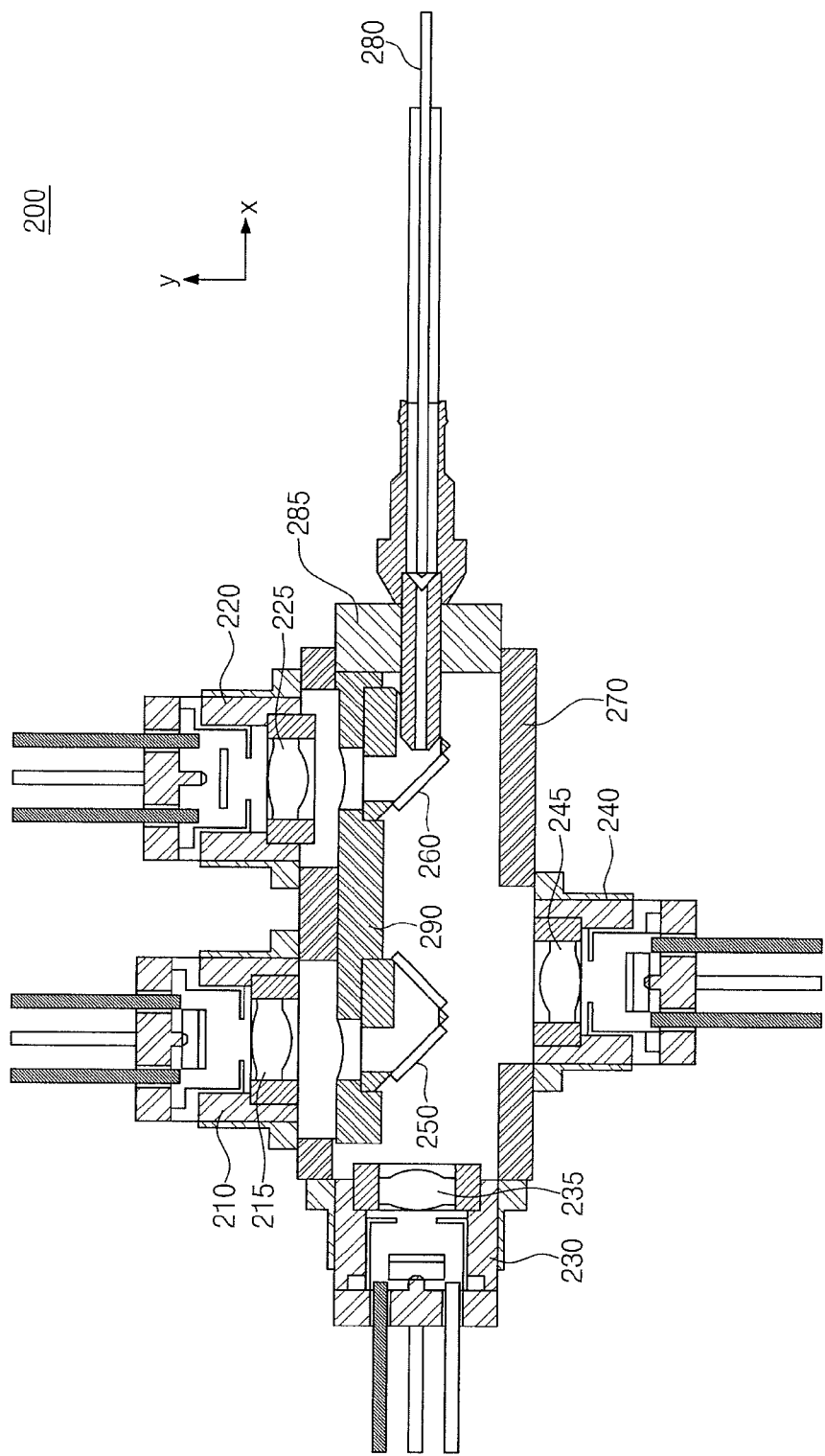
FIG. 10 is a view illustrating a multi-channel optical module according to other embodiments of the inventive concept.

FIG. 10 is a view illustrating a multi-channel optical module 200 according to other embodiments of the inventive concept. Referring to FIG. 10, a multi-channel optical module 200 according to other embodiments may include filter holders 250 and 260 and a quadrangular housing 270 for optically coupling a single optical fiber 280 to a plurality of light emitting devices 210, 220, 230, and 240. Particularly, the filter holders 250 and 260 may not be individually inserted in the quadrangular housing 170 but may be installed at a common filter holder base 290 having a semicircular shape and then be inserted in an x-axis direction. The multi-channel optical module 200 will be described in more detail hereinafter.

The light emitting devices 210, 220, 230, and 240 may generate lights of wavelengths different from each other, respectively. Optical signals outputted from the light emitting devices 210 and 220 may be concentrated to the optical fiber 280 via through-holes disposed in the filter holders 250 and 260, respectively.

The filter holes 250 and 260 may be installed at the common filter holder base 290 and then be inserted in the quadrangular housing 270 so that the filter holes 250 and 260 may protrude in the inside of the quadrangular housing 270. The common filter holder base 290 and an optical fiber holder 285 may be manufactured in united body. Particularly, a side surface of the optical fiber holder 285 may have a quadrangular shape, or a cylindrical shape having a flat plane partially polished. Thus, optical alignment of the filter holders 250 and 260 may be achieved only by inserting the filter holders 250 and 260 and the optical holder 285. The common filter holder base 290 will be described in more detail later.

Optical lenses 215, 225, 235, and 245 may be included in the light emitting devices 210, 220, 230, and 240, respectively. The optical lenses 215, 225, 235, and 245 may condense the optical signals outputted from the light emitting devices 210, 220, 230, and 240, respectively. Alternatively, each of the light emitting devices 210, 220, 230, and 240 may consist of a light receiving device, or combination of a light emitting device and a light receiving device. By using the light receiving device and the light emitting device, the multi-channel optical module 200 may be formed into a light transmitting module, a light receiving module, or a light transmitting and receiving module. Particularly, when the multi-channel optical module 200 is the transmitting and receiving module, blocking filters transmitting only optical signals of specific wavelengths may be used as optical filters mounted on the filter holders 250 and 260 for reducing or minimizing optical cross-talk Two filter holders 250 and 260 may be used for the four-channel. Two optical filters may be mounted on the filter holder 250 and a single optical filter may be mounted on the filter holder 260. After the optical filters are mounted on the filter holders 250 and 260, the filter holders 250 and 260 may be mounted on the common filter holder base 290. The common holder base 290 may be inserted in the quadrangular housing 270 in the x-axis direction to perform automatic alignment function.

Figure 11:
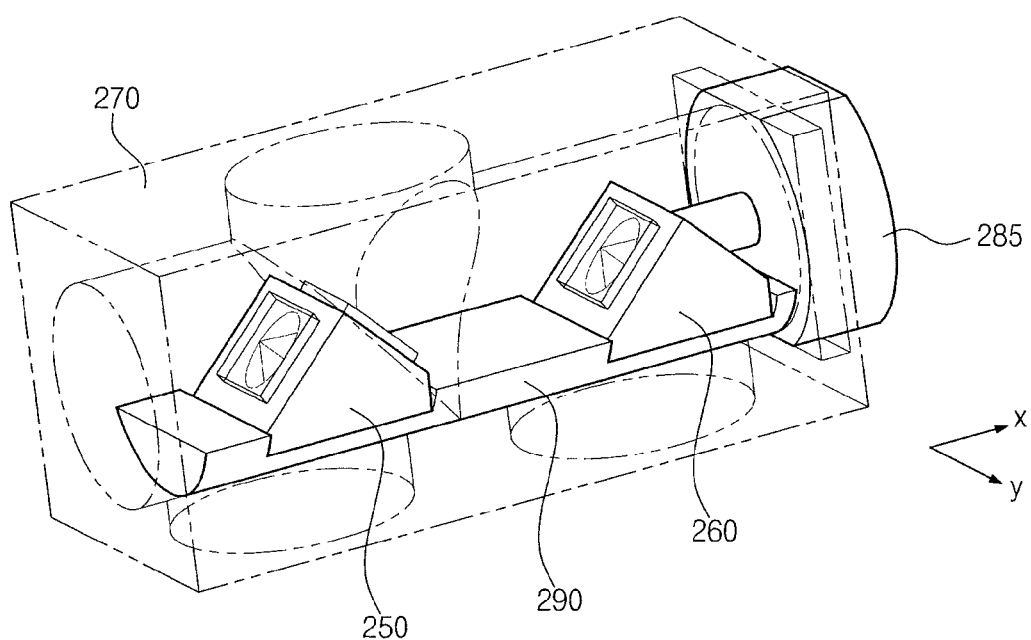
FIG. 11 is a perspective view illustrating the multi-channel optical module of FIG. 10 including a semicircular common filter holder base.
Figure 12:
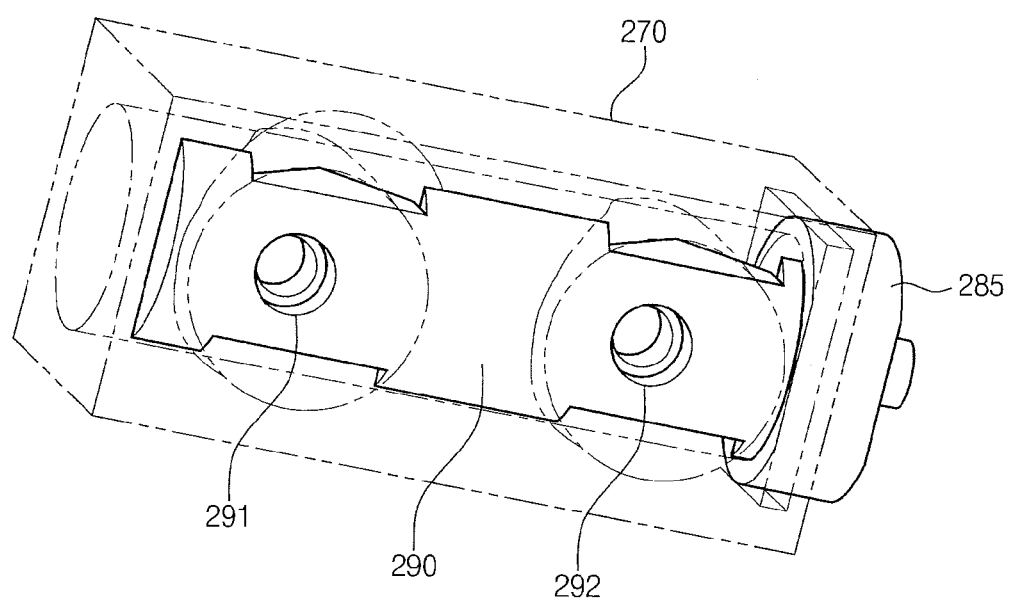
FIG. 12 is a perspective view illustrating a bottom surface of a semicircular common filter holder base of FIG. 11.

FIGS. 11 and 12 are perspective views illustrating the inside of the quadrangular housing 270 of the multi-channel optical module 200 of FIG. 10.

Referring to FIG. 11, the filter holders 250 and 260, the common filter holder base 290, and the optical fiber holder 285 are illustrated in FIG. 11. The optical fiber holder 285 and the common filter holder base 290 may be manufactured in united body. The filter holders 250 and 260 may be mounted in grooves disposed in the common filter holder base 290, respectively. For exactly mounting the filter holders 250 and 260 on the common filter holder base 290, widths of the grooves in the common filter holder base 290 are matched for widths of bottoms of the filter holders 250 and 260, respectively. A side surface of the optical fiber holder 285 may be fixed in a hole of the quadrangular housing 270. For example, the side surface of the optical fiber holder 285 may have a cylindrical shape including both flat sidewalls formed by a polishing process. Thus, the optical fiber holder 285 and the quadrangular housing 270 are engaged with each other, so that the optical alignment may be achieved.

Referring to FIG. 12, two holes 291 and 292 may be formed in a bottom portion of the common filter holder base 290. The optical signals outputted from the light emitting devices may pass through the holes 291 and 292 and then be transferred to the optical filters. Optical paths between the light emitting devices and the optical filters may be formed through the holes 291 and 292.

Figure 13:
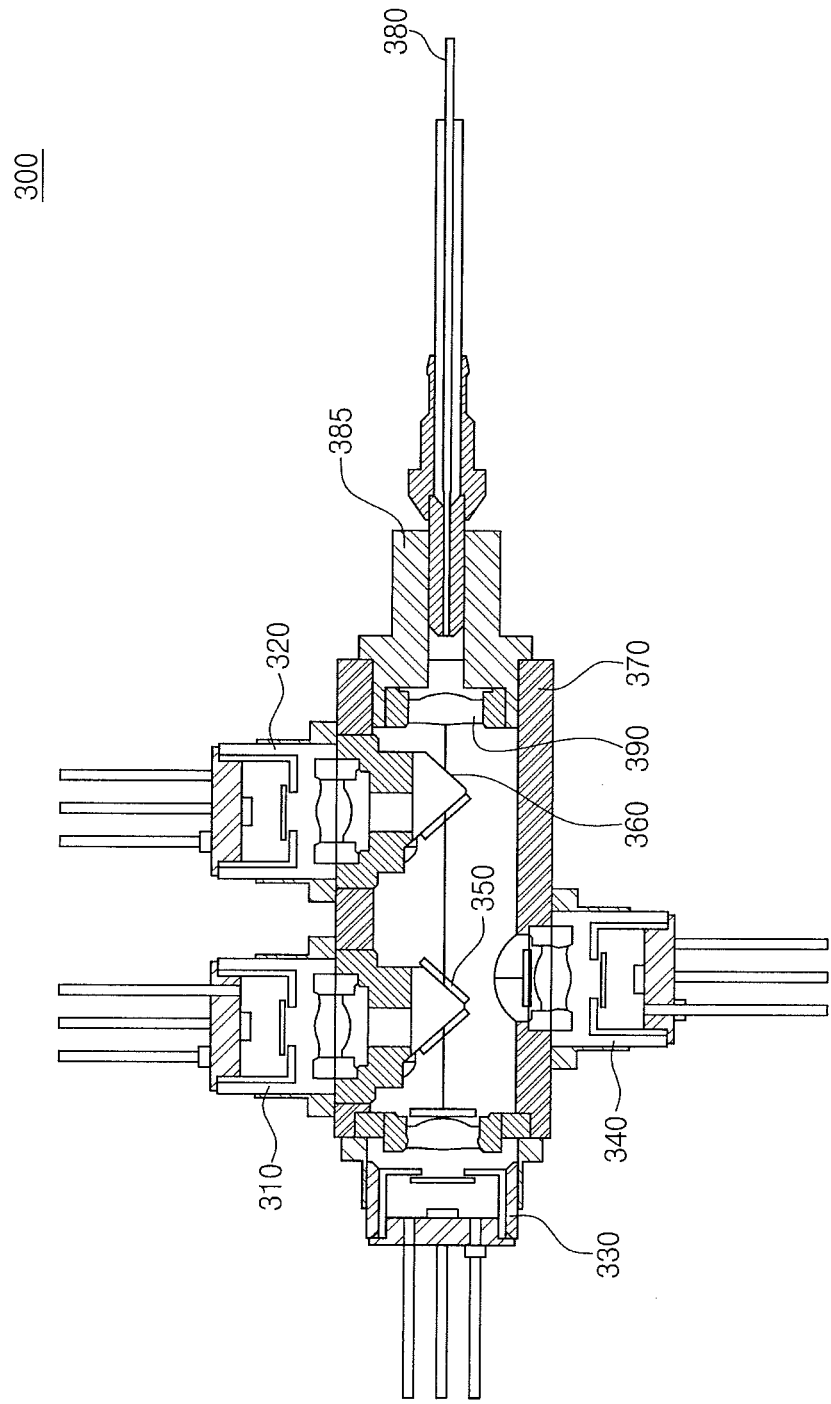
FIG. 13 is a view illustrating a multi-channel optical module according to still other embodiments of the inventive concept.

FIG. 13 is a view illustrating a multi-channel optical module according to still other embodiments of the inventive concept. Referring to FIG. 13, a multi-channel optical module 300 may be a light receiving module. The multi-channel optical module 300 constituting the light receiving module may include filter holders 350 and 360, a quadrangular housing 370, and an collimating lens 390 for optically coupling a single optical fiber 380 to a plurality of light receiving devices 310, 320, 330, and 340.

Elements of the light receiving devices 310, 320, 330, and 340 and the filter holders 350 and 360 may be substantially the same as those of the light emitting devices 110, 120, 130, and 140 and the filter holders 150 and 160 of FIG. 1. Thus, detail descriptions of the light receiving devices 310, 320, 330, and 340 and the filter holders 350 and 360 will be omitted. However, a received optical signal through the optical fiber 380 may pass through the collimating lens 390 and then be transferred to the optical filters of the filter holders 350 and 360. The optical signals having four wavelengths may be transmitted through or reflected by the optical filters mounted on the filter holders 350 and 360 and then reach the light receiving devices 310, 320, 330, and 340, respectively. When the multi-channel optical module 300 is the light receiving module, blocking filters transmitting only optical signals of specific wavelengths may be mounted in the light receiving devices 310, 320, 330, and 340.

Figure 14:
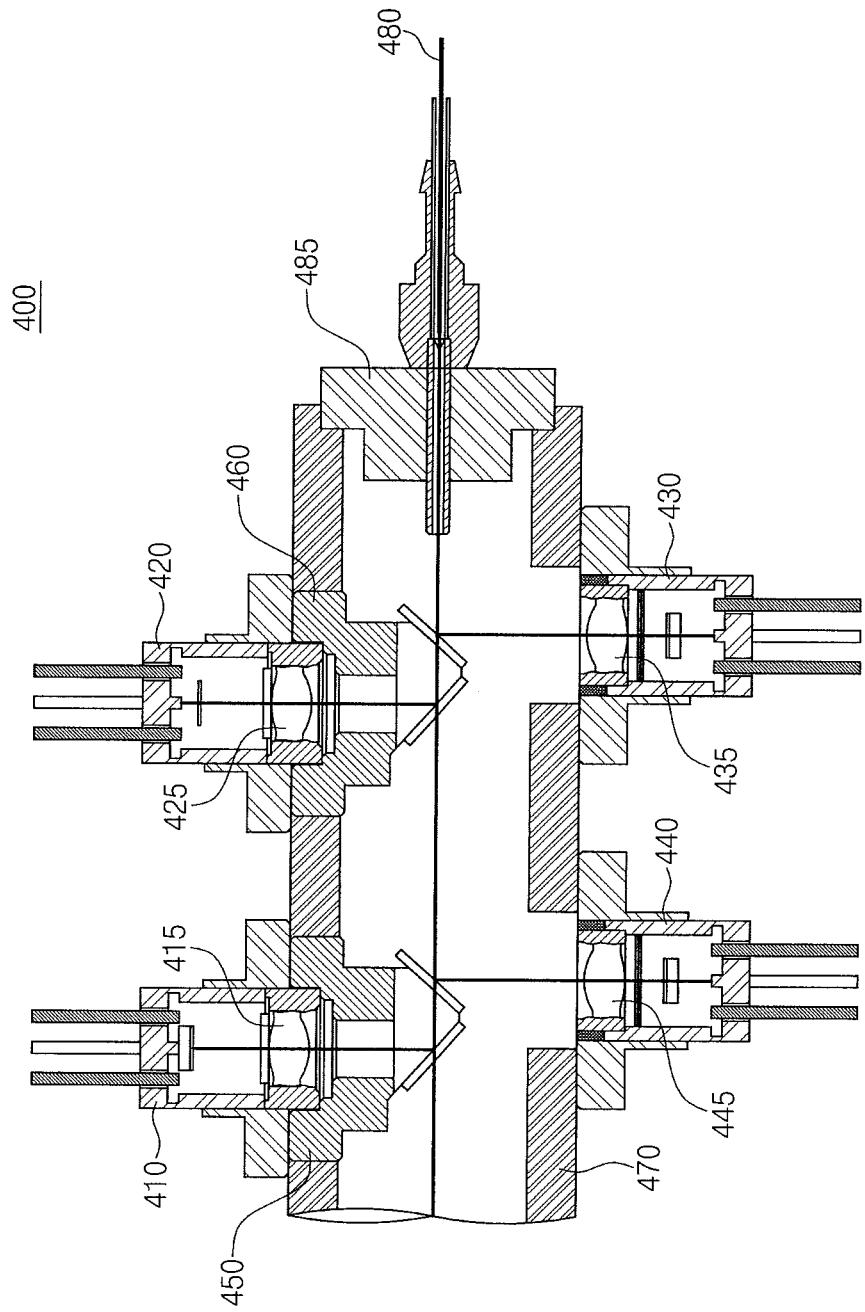
FIG. 14 is a view illustrating a multi-channel optical module according to yet other embodiments of the inventive concept.

FIG. 14 is a view illustrating a multi-channel optical module according to yet other embodiments of the inventive concept. Referring to FIG. 14, a multi-channel optical module 400 shows two optical filter mounted one filter holder as an example. The multi-channel optical module 400 may include filter holders 450 and 460 and a quadrangular housing 470 for optically coupling a single optical fiber 480 to a plurality of optical devices 410, 420, 430, and 440.

Elements of the optical devices 410, 420, 430, and 440 and the filter holders 450 and 460 may be similar to those of the light emitting devices 110, 120, 130, and 140 and the filter holders 150 and 160 of FIG. 1. However, two optical filters may also be mounted on the filter holder 460 adjacent to the optical fiber 480. Thus, one filter holder may be disposed between two optical devices facing each other. The optical devices 410, 420, 430, and 440 may be light receiving devices or light emitting devices. According to the present embodiment, as the number of channels increases, optical filters and/or optical devices may be easily added in the multi-channel optical module.

In the embodiments described above, one or two optical filters may be mounted on one filter holder. However, the inventive concept is not limited thereto. In other embodiments, three or more optical filters may be mounted on one filter holder.

According to embodiments of the inventive concept, the multi-channel optical module may resolve the optical alignment problems between the quadrangular housing, the filter holder, and the optical fiber. According to embodiments of the inventive concept, the filter holder may be simply inserted in the quadrangular housing, so that the optical alignment may be automatically achieved. Thus, the multi-channel optical module may increase or maximize optical coupling efficiency. Additionally, according to embodiments of the inventive concept, the number of the channels may easily increase. Thus, it is possible to manufacturing the multi-channel optical module having a lot of the channels.

Additionally, the two 45-degrees planes of the filter holder may be formed in protruding shape. Thus, the multi-channel optical module may be easily formed or polished. Thus, a failure rate may be reduced to realize mass production of low cost. Moreover, since the 45-degrees planes of the filter holder are formed in protruding shape, the optical filters may be easily mounted on the 45-degrees planes. Furthermore, the filter holder may be formed of an insulator, and the filter holder and the package having the optical device may be manufactured in united body and then installed in the quadrangular housing. Thus, the filter holder is electrically insulated from the quadrangular housing. As a result, the electrical cross-talk may be reduced or minimized and the number of the laser welding processes may be reduced to reduced manufacturing cost.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A multi-channel optical module for receiving or transmitting optical signals of a plurality of wavelengths comprising:
   at least one optical device receiving or transmitting optical signals;
   a housing for optically coupling the plurality of optical devices to an optical fiber;
   at least one optical filter separating or multiplexing the optical signals according to wavelengths of the optical signals between the optical fiber and the plurality of optical devices;
   at least one filter holders providing a fixing position of the filter holder with respect to the housing; and
   at least one package comprising the at least one optical device, the at least one optical filter, and the at least one filter holder, where the at least one optical device and the at least one optical filter are mounted to the at least one filter holder,
   wherein the housing has at least one filter holder insertion hole having the same quadrangular shape as the at least one filter holder of the package and, when the package is inserted into a respective filter holder insertion hole, the optical filter mounted in the package automatically aligns optical paths between the optical fiber and the at least one optical device.

2. The multi-channel optical module of claim 1, wherein a filter surface of the at least one optical filter is inclined with respect to a light traveling direction by a predetermined angle for exchanging an optical signal of a specific wavelength between the optical fiber and the at least one optical device.

3. The multi-channel optical module of claim 1, wherein the at least one optical device mounted on the respective filter holder exchanges the optical signal for the optical fiber through a through-hole of the respective filter holder.

4. The multi-channel optical module of claim 1, wherein the at least one optical device facing the at least one filter holder exchanges the optical signal reflected by an optical filter mounted on the facing filter holder.

5. The multi-channel optical module of claim 1, wherein the at least one filter holder comprises:
   a filter holder base for providing the fixing position of the at least one filter holder when the at least one filter holder is inserted into the inside of the housing from an outside of the housing; and
   a filter holder body on which the optical filter is mounted, the filter holder body for providing the optical path between a filter surface of the optical filter and the at least one optical device.

6. The multi-channel optical module of claim 5, wherein the filter holder body having a through-hole for providing the optical path between the optical device and the optical filter.

7. The multi-channel optical module of claim 6, wherein a side of the filter holder base or the filter holder body has the same shape as the filter holder insertion hole of the housing which is in contact with the side of the filter holder.

8. The multi-channel optical module of claim 1, wherein the at least one filter holder is formed of an insulator so that the filter holder is electrically insulated from the housing.

9. The multi-channel optical module of claim 1, wherein the filter holder is mounted on a semicircular filter holder base.

10. The multi-channel optical module of claim 9, further comprising:
    an optical fiber holder for inserting the optical fiber into the housing,
    wherein the optical fiber holder and the filter holder base are provided in united body.

11. The multi-channel optical module of claim 10, wherein the filter holder, the filter holder base, and the optical fiber holder constitutes one insertion unit; and
    wherein the one insertion unit is inserted into the housing in an extending direction of the optical fiber.

12. The multi-channel optical module of claim 10, wherein the filter holder base has a through-via for providing the optical path the filter holder and the optical device.

13. The multi-channel optical module of claim 10, wherein a side surface of the optical fiber holder has the same shape as a contact surface of the housing which is in contact with the side surface, so that the optical fiber holder has an angular pillar shape.

14. The multi-channel optical module of claim 1, further comprising:
    at least one optical lens condensing the optical signals inputted to or outputted from the plurality of optical devices.

15. The multi-channel optical module of claim 14, wherein the optical lens is inserted into the filter holder.

16. The multi-channel optical module of claim 1, wherein the plurality of optical devices are light receiving devices, the multi-channel optical module, further comprising:
    a blocking filter for increasing selectivity with respect to an received optical signal.

17. The multi-channel optical module of claim 1, further comprising:
    an collimating lens disposed at a longitudinal end of the optical fiber for collimating an optical signal provided to the plurality of optical devices through the optical fiber.

* * * * *